(12) United States Patent
Mitsch

(10) Patent No.: US 8,511,637 B2
(45) Date of Patent: Aug. 20, 2013

(54) HORIZONTALLY AND VERTICALLY ADJUSTABLE BEARING

(75) Inventor: Franz Mitsch, Heppenheim (DE)

(73) Assignee: FM Energie GmbH & Co., KG, Heppenheim (DE)

( * ) Notice: Subject to any disclaimer, the term of this patent is extended or adjusted under 35 U.S.C. 154(b) by 12 days.

(21) Appl. No.: 13/060,392

(22) PCT Filed: Sep. 1, 2009

(86) PCT No.: PCT/EP2009/006288
§ 371 (c)(1),
(2), (4) Date: Feb. 23, 2011

(87) PCT Pub. No.: WO2010/025880
PCT Pub. Date: Mar. 11, 2010

(65) Prior Publication Data
US 2011/0150374 A1 Jun. 23, 2011

(30) Foreign Application Priority Data
Sep. 5, 2008 (EP) .................................... 08015626

(51) Int. Cl.
*F16M 1/00* (2006.01)
(52) U.S. Cl.
USPC ............ 248/677; 248/615; 248/618; 248/638
(58) Field of Classification Search
USPC ................ 248/580, 649, 650, 656, 657, 677, 248/688, 673, 651, 658, 680, 188.1, 188.2, 248/188.4, 188.8, 346.05, 346.06, 500, 562, 248/609, 615, 618, 632, 633, 634, 635, 637, 248/638, 678
See application file for complete search history.

(56) References Cited

U.S. PATENT DOCUMENTS

| | | | | |
|---|---|---|---|---|
| 1,987,726 | A * | 1/1935 | Wilkerson et al. | 248/657 |
| 2,057,990 | A | 10/1936 | Whitaker | |
| 3,361,410 | A * | 1/1968 | Messer | 254/101 |
| 3,455,526 | A | 7/1969 | Orii | |
| 3,578,281 | A | 5/1971 | Nielsen et al. | |
| 3,669,393 | A * | 6/1972 | Paine et al. | 248/188.4 |
| 3,815,852 | A | 6/1974 | May | |
| 4,061,298 | A * | 12/1977 | Kober | 248/677 |
| 4,141,527 | A * | 2/1979 | Wolf | 248/562 |
| 4,893,779 | A * | 1/1990 | Bergelt | 248/638 |
| 5,511,760 | A * | 4/1996 | Kambara | 248/650 |
| 5,653,417 | A * | 8/1997 | DeBarber et al. | 248/688 |
| 5,975,480 | A * | 11/1999 | Schaefer et al. | 248/678 |
| 6,702,246 | B1 * | 3/2004 | Schriever | 248/656 |
| 6,871,412 | B2 * | 3/2005 | Markeson | 33/358 |
| 6,889,946 | B2 * | 5/2005 | Bizaj | 248/188.2 |

(Continued)

FOREIGN PATENT DOCUMENTS

| DE | 1 154 678 | 9/1963 |
|---|---|---|
| DE | 20 2005 001 519 U1 | 4/2005 |

(Continued)

*Primary Examiner* — Terrell McKinnon
*Assistant Examiner* — Eret McNichols
(74) *Attorney, Agent, or Firm* — Davis & Bujold, PLLC

(57) ABSTRACT

A bearing (3), preferably elastomeric, which can be employed in machine construction (1), in particular for generators of wind turbines. The bearing (3), owing to its design, can be positioned both in the vertical and also in the horizontal direction under load at any time in such a way that any present drive/gear shafts are aligned with one another.

18 Claims, 3 Drawing Sheets

(56) References Cited

U.S. PATENT DOCUMENTS

| | | | |
|---|---|---|---|
| 7,744,050 B2* | 6/2010 | de Toledo et al. | 248/188.3 |
| 8,276,859 B1* | 10/2012 | Caddell | 248/188.4 |
| 8,328,149 B2* | 12/2012 | McLaughlin | 248/188.4 |
| 2002/0014573 A1* | 2/2002 | Anderson | 248/677 |
| 2005/0061946 A1* | 3/2005 | Krapels | 248/677 |
| 2006/0169866 A1* | 8/2006 | Vermeulen | 248/677 |
| 2009/0211058 A1* | 8/2009 | Nagayama | 16/446 |

FOREIGN PATENT DOCUMENTS

| | | |
|---|---|---|
| EP | 0590316 A1 | 4/1994 |
| JP | 63114838 A1 | 5/1988 |
| WO | 03 036156 A1 | 5/2003 |

* cited by examiner

HORIZONTALLY AND VERTICALLY ADJUSTABLE BEARING

This application is a National Stage completion of PCT/EP2009/006288 filed Sep. 1, 2009, which claims priority from European Patent Application Serial No. EP 08 015 626.8 filed Sep. 5, 2008.

FIELD OF THE INVENTION

The invention relates to a bearing, preferably elastomeric, which can be employed in machine construction, in particular for generators of wind turbines, and, owing to its design, can be positioned both in the vertical and also in the horizontal direction under load at any time in such a way that the drive/gear shafts present align precisely with one another.

The novel bearing enables a generator to be adjusted optimally in relation to components connected thereto, such as gearbox or motor, under load, which ensures precise running of the generator. This results in the elimination or reduction of undesired vibrational forces acting on the generator or system or generated by the generator or system itself, and premature wear of the parts employed is prevented, or damage is prevented to the system, in particular to the cardan shaft between generator and gearbox.

The vertically and horizontally adjustable bearing according to the invention is particularly suitable for generators, and preferably for generators in wind turbines.

BACKGROUND OF THE INVENTION

Generators of wind turbines must be aligned precisely in relation to the gearbox output shaft. This is carried out on the one hand during manufacture of the turbine and on the other hand after installation of the turbine and attachment of the rotor. Due to manufacturing tolerances and the forces acting on the wind turbine housing after rotor installation, it cannot be assumed that the generator can be installed so precisely in relation to the gearbox that the output shaft of the generator aligns precisely with the gear shaft. Generators therefore have to be brought into the correct position after mounting of the rotor.

This is usually carried out by lifting the generator by means of a crane, hoist, etc., and pushing it into the correct position. On the other hand, there are now devices which make the entire generator support movable. The alignment necessary is carried out horizontally and vertically in the direction perpendicular to the generator axis. Alignment axial to, i.e. in the direction of, the generator shaft is generally unnecessary, since misalignment in the shaft-hub connection can be compensated for.

An exclusively height-adjustable generator bearing is known, for example, from German utility model application DE 20 2005 001 519. This describes an elastomeric bearing, essentially consisting of a conical support or bearing foot, a conical elastomer bearing and a conical cap provided with the same cone angle, which has at the top a round threaded hole centrally along the vertical axis of the bearing, for the accommodation of the generator mount and is placed over the conical elastomer bearing, and has an adjustment device acting in the axial direction which enables the generator, which is attached to the central mount, to be adjusted in its position along the central axis of the bearing by raising or lowering.

Here the vertical adjustment can in practice only be carried out when the generator is not on the bearing, i.e. without load before installation and mounting of the generator. This is a significant disadvantage since, after the generator has been placed on the individual bearing elements, these are usually subjected to unequal loads, which can in turn result in misalignment. Any necessary readjustment is often only possible under more difficult conditions, e.g. by briefly relieving the load by lifting the generator block. In addition, horizontal adjustment of the generator cannot be carried out by means of the solution described in the utility model.

The objective was thus to provide a bearing which can be adjusted and accurately aligned in the vertical and horizontal position at any time, i.e. including after initial installation and initial mounting, in both directions under load, i.e. without removal or lifting of the generator block or machine block, in a simple manner and at any time, so that readjustments can also be carried out without problems if the conditions have changed due to operation (for example due to unequal fatigue of the bearing elements, etc.).

The object has been achieved by the provision of the bearing according to the invention, as described below and characterized in the claims.

The bearing according to the invention is suitable not only for generators for wind turbines, but also generally for heavy generators and machine parts which are connected to other components of the system or machine which are moving or subjected to movement.

SUMMARY OF THE INVENTION

The invention thus relates to a machine or generator bearing for the vertical adjustment thereof, comprising a bearing foot (3), to which the generator/machine block is connected by means of an fixing bolt (9), which is passed through a hole (7) in the foot (1a) of the gearbox/machine block (1) and is fixed and tightened by means of a thread (8) in or on the bearing foot (3), where, for vertical adjustment of the generator/machine block, the bearing foot (3) has an adjustment bolt (12), which can be screwed vertically together with a threaded part (13), which is connected to the bearing fool (3), where the adjustment bolt (12) has a centrally arranged square or polygonal opening (11) having a diameter which is greater than that of the fixing bolt (9) for the accommodation of a corresponding polygonal key (14), by means of which the vertical-adjustment bolt (12) can be screwed in and out through the hole (7) with the fixing bolt (9) previously removed, causing specific lowering or raising of the generator/machine block under load.

The invention thus also relates to a machine or generator bearing for the horizontal adjustment thereof, comprising a bearing foot (3), to which the generator/machine block is connected by means of a fixing bolt (9), which is passed through a hole (7) in the foot (1a) of the gearbox/machine block (1) and is fixed and tightened by means of a thread (8) in or on the bearing foot (3), where, for horizontal adjustment of the generator/machine unit, the bearing foot (3) has a movable carriage (4), which is provided with a hole (7b) and which is installed between the bearing foot (3) and the foot (1a) of the generator/machine unit (1) and can be moved horizontally perpendicular to the axis of the unit (1), where the carriage (4) and the unit (1) fixed thereto are movable horizontally by means of a screw-connection device (19) mounted on the carriage by screwing it together with a threaded part (20), which is connected to the bearing foot (3) and holds and guides the carriage so that it can be specifically moved to and fro laterally.

The invention relates, in particular, to a machine or generator bearing for the horizontal and vertical adjustment thereof, comprising a bearing foot (3), to which the generator/machine block is connected by means of an fixing bolt (9), which is passed through a hole (7) in the foot (1a) of the gearbox/machine block (1) and is fixed and tightened by means of a thread (8) in or on the bearing foot (3), where (i) for vertical adjustment of the generator/machine block, the bearing foot (3) has an adjustment bolt (12), which can be screwed vertically together with a threaded part (13), which is connected to the bearing foot (3), where the adjustment bolt (12) has a centrally arranged square or polygonal opening (11) having a diameter which is greater than that of the fixing bolt (9) for the accommodation of a corresponding polygonal key (14), by means of which the vertical-adjustment bolt (12) can be screwed in and out through the hole (7) with the fixing bolt (9) previously removed, causing specific lowering or raising of the generator/machine block under load, and (ii) for horizontal adjustment of the generator/machine unit, the bearing foot (3) has a movable carriage (4), which is provided with a hole (7b) and which is installed between the bearing foot (3) and the foot (1a) of the generator/machine unit (1) and can be moved horizontally perpendicular to the axis of the unit (1), where the horizontal adjustment of the carriage (4) and the unit (1) fixed thereto takes place through a screw-connection device (19) which is attached to the carriage by screwing it together with a threaded part (20), which is connected to the bearing foot (3) and holds and guides the carriage so that it can be moved laterally to and fro specifically.

BRIEF DESCRIPTION OF DRAWINGS

A bearing of this type will now be described, by way of example, with reference to the accompanying drawings in which.

DETAILED DESCRIPTION OF THE INVENTION

Figure 1:
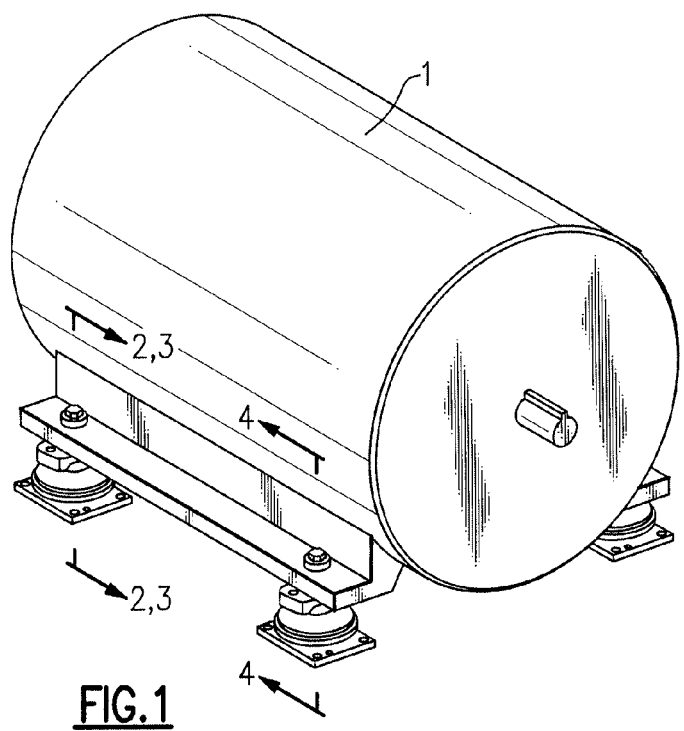
FIG. 1 is a perspective view a generator with bearings according to the invention.
Figure 2:
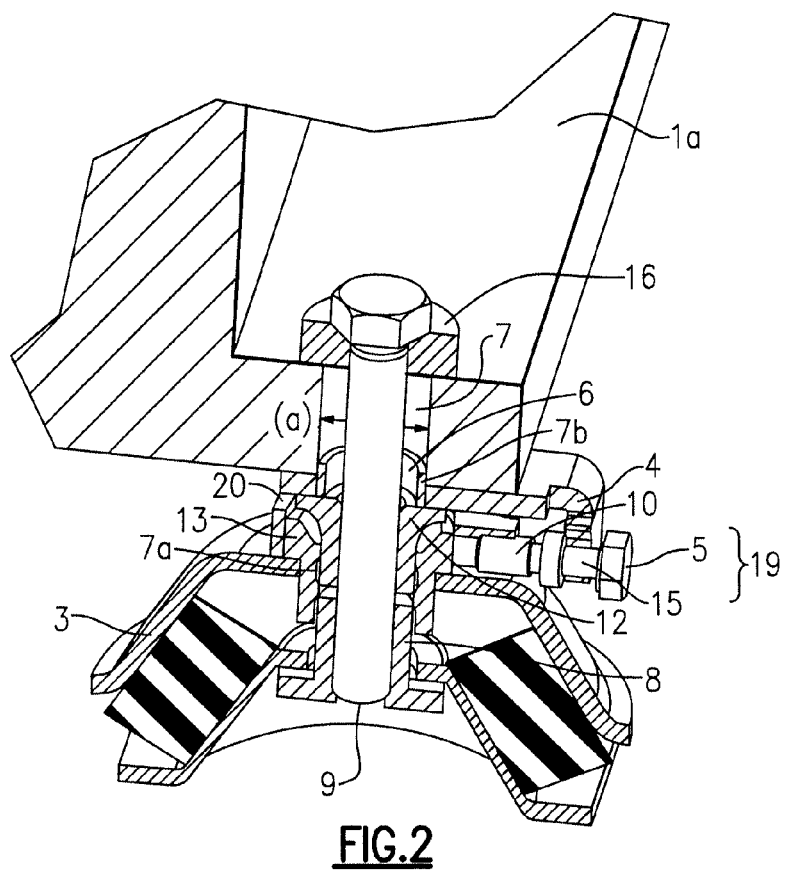
FIG. 2 is a first sectional perspective view of the bearing according to the invention.
Figure 3:
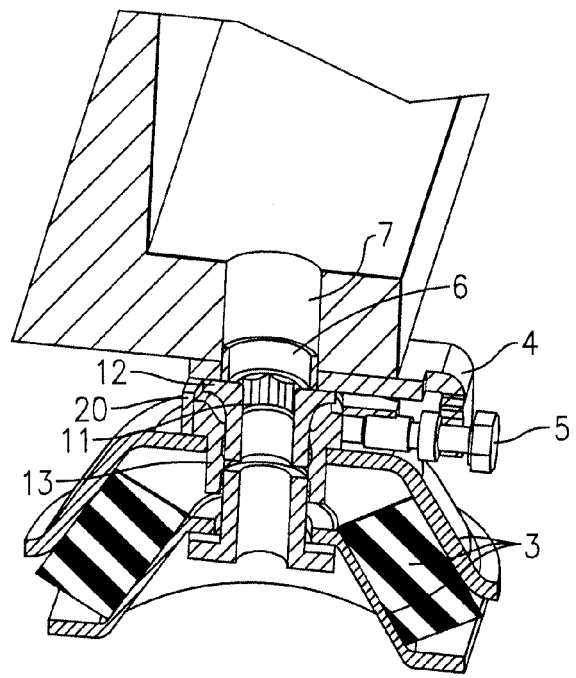
FIG. 3 is second sectional perspective view of the bearing according to the invention but without the bolt being shown.
Figure 4:
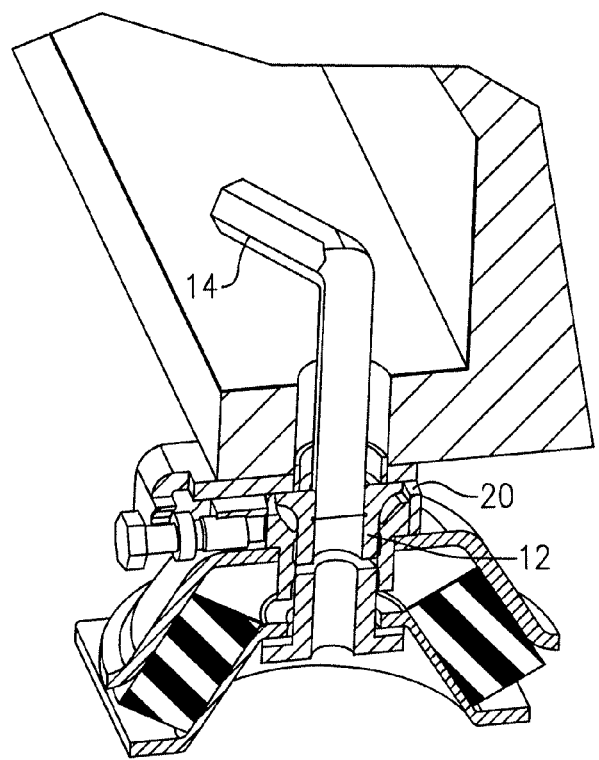
FIG. 4 is a third sectional perspective view of the bearing according to the invention.
Figure 5:
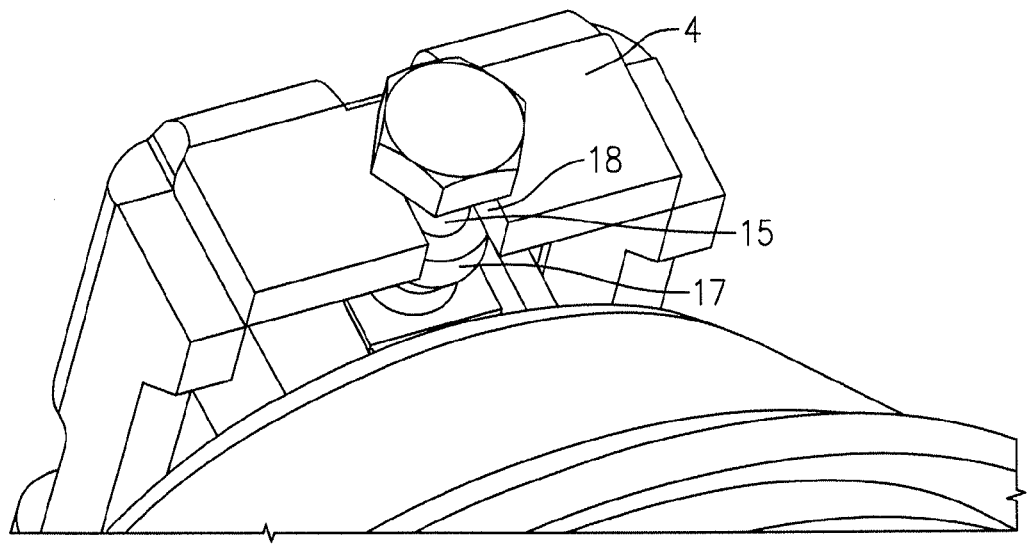
FIG. 5 is a fourth perspective view of the bearing according to the invention.
Figure 6:
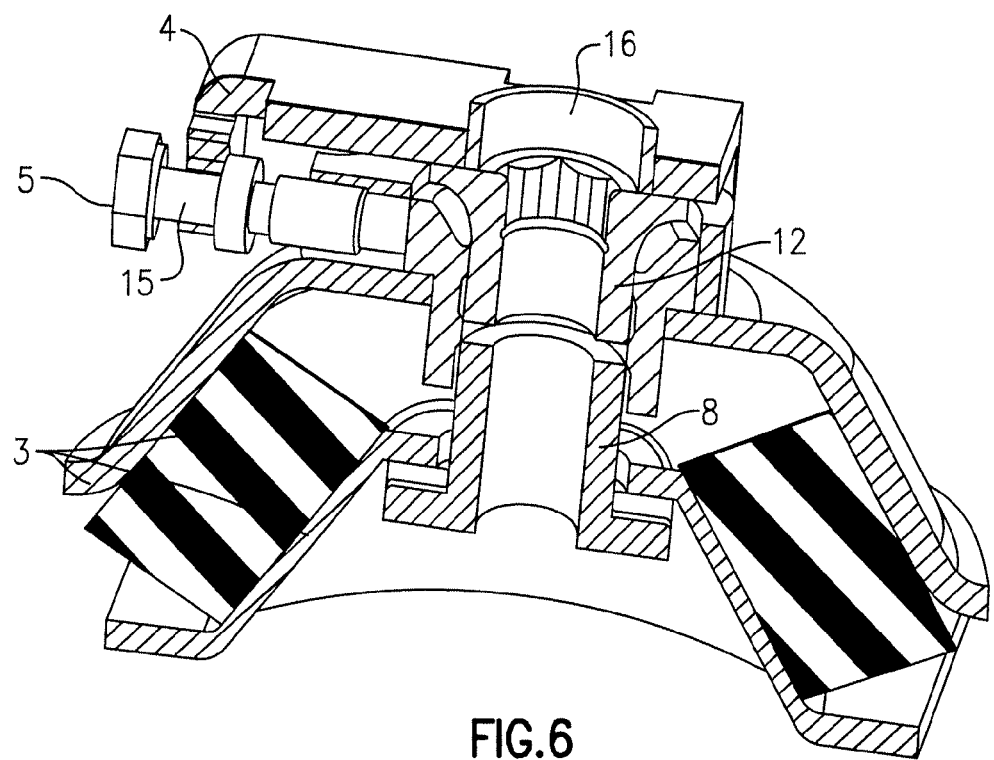
FIG. 6 is a fifth sectional perspective view of the bearing according to the invention but without the generator/machine unit and the bolt being shown.

In accordance with the invention, the thread (8) is either a thread which has been cut on or in the bearing foot, or it is an attachment nut which is arranged on or in the bearing foot.

The bearing according to the invention preferably has a bearing foot (3) which has a central hole (7a) into which the components of various types can be screwed or inserted. Accordingly, this hole (7a) can be smooth internally or have a thread for the accommodation of nuts (e.g. 8, 13) or bolts (e.g. 9) or bolts and bushings. The hole may also have different internal diameters for the accommodation of bolts, nuts, or bushings of different sizes.

However, the bearing foot (3) can also have attachments of different types, to which the elements according to the invention can be fixed.

The invention thus relates to a bearing which has a bearing foot (3) having a central hole (7a). In a preferred embodiment, the inside surface of the hole (7a) is smooth, i.e. it does not have a thread.

The following description relates to bearings which are provided with a bearing foot (3) having a centrally arranged hole (7a).

For the accommodation of the vertical bolt (12), the bearing according to the invention has a supporting nut (13), which has either been inserted into the upper part of the central hole (7a) or has been screwed into the threaded part of the hole (7a) provided for this purpose by means of an external thread.

However, the vertical bolt (12) can also be screwed into and out of a thread cut into the hole (7a) without the use of a supporting nut (13). The bearing according to the invention preferably has a vertical-adjustment bolt (12), which is screwed into a supporting nut (13), where the supporting nut is inserted into the smooth central hole in the bearing foot.

The vertical bolt (12), by means of which the vertical lowering and raising of the generator/machine block takes place, has in accordance with the invention a central polygonal, at least square, opening (11) facing perpendicularly upwards towards the generator/machine block for the accommodation of a correspondingly designed polygonal or Allen key (14). The opening (11), and thus also the corresponding key (14), is preferably designed as a square, pentagon, but in particular hexagon. The opening (11) of the vertical bolt (12) necessarily passes right through, since the fixing bolt (9) is also inserted through this opening in order to be able to be clamped to the bearing foot, preferably via the attachment nut (8). The diameter of the fixing bolt (9) should thus be somewhat smaller than the diameter of the opening (11) in the vertical bolt (12).

The matching polygonal key, preferably hexagonal Allen key (14), is in accordance with the invention passed from above through the hole (7) in the foot (1a) of the generator/machine block (1) lying on the bearing foot, inserted into the opening (11) of the vertical bolt (12) and turned correspondingly. Height adjustment can thus take place without the bearing and generator/machine having to be separated from one another. Depending on the thread travel of the vertical-adjustment bolt (12), different vertical-adjustment travels can thus be achieved. In practice, vertical-adjustment travels of ±5 mm to ±10 mm have proven adequate; however, greater or smaller travels can also be achieved in accordance with the invention.

For the horizontal adjustment of the generator/machine unit, the bearing foot (3) has a movable carriage (4), which is provided with a hole and which is installed between the bearing foot (3) and the foot (1a) of the generator/machine unit (1) and can in accordance with the invention be moved horizontally perpendicular to the axis of the unit (1). The movable carriage (4) has a screw-connection device (19), which, in the simplest design, is a bolt (5), the screwing of which into or out of a threaded part (20) connected directly or indirectly to the bearing foot facilitates the horizontal movement or adjustment of the carriage. The screw-connection device (19) and the threaded part (20) are arranged perpendicular to the axis of the generator, enabling lateral adjustment of the carriage aligned perpendicular to the axis to take place.

The threaded part (20) is either a part of the bearing foot (3), or it is, as depicted in the drawings, an independent component, which has, for example, a bore or opening and can be placed on a correspondingly shaped edge or collar present, preferably around the central hole (7a) in the bearing foot, and firmly fixed thereto. In this type of connection, the threaded part (20), which is connected to the screw-connection element (19) of the carriage (4), does not move vertically with the carriage (4) when the generator/machine block is moved vertically by the vertical-adjustment bolt (12). In order for vertical adjustment, as described, to nevertheless become possible, the screw-connection element (19) (in the simplest case the spindle bolt (5)) on the carriage must not be guided in a round hole in the carriage, but instead in a slot (18).

However, the threaded component (20) can also be firmly connected to the vertical-adjustment bolt (12), which, as described above, is a constituent of the bearing foot (3). In this case, the separation between the part (20) and the carriage (4) always remains the same on vertical adjustment by means of the bolt (12). The screw-connection unit (19) can thus be passed through a hole of defined diameter in the carriage (4) (e.g. in the diameter of the bolt spindle (5)), and the slot (18) is superfluous.

The design of the carriage is conceived in such a way that it is freely movable, preferably without lying directly on the bearing foot, via the central hole (7a) in the bearing foot, or the vertical-adjustment bolt (12) can slide away. Furthermore, the carriage (4) has a hole (7b), which corresponds in diameter to the hole (7) in the generator foot (1a) lying on it. The generator foot is placed on the carriage (4) in such a way that the two holes are aligned one above the other.

The carriage (4) and thus the generator/machine block are preferably moved horizontally with the fixing bolt (9), which is passed through the holes (7, 7b), not inserted or inserted but not tightened. The lateral adjustment can thus take place to the (theoretical) stop of the carriage at the bolt (9). The adjustment travel (a) thus arises from the difference in the diameters of the holes (7, 7b) and the bolt (9). Through a corresponding choice of the diameters, varying horizontal-adjustment travel can thus be achieved. The maximum adjustment travel (a) in conventional wind turbines usually does not exceed 20 mm. If a central position is assumed at which the bolt (9) has the same separation from the inside wall of the hole (7), horizontal adjustment is possible within a range of ±10 mm, preferably ±5 mm. However, greater adjustment travels (a), such as, for example, ±15 or ±20 mm, can also be facilitated by corresponding design measures.

In order to prevent the heavy generator block from slipping on the carriage (4), if the carriage is moved horizontally to and fro by actuation of the screw-connection device (19), the bearing foot (3) or alternatively also the foot (1a) has a fixing means. This can be achieved, for example, by a transverse-adjustment bushing (6). This transverse-adjustment bushing is preferably a metal ring, which is either inserted into the hole (7b) in the carriage (4) with a close fit and projects beyond the edge thereof, so that it thus extends into the hole (7) in the foot (1a) of the generator/machine block with a close fit and thus fixes and retains the latter. On the other hand, the same result is obtained if the transverse adjustment bushing (6) is placed in the hole (7) in the foot (1a) and allowed to project into the hole (7b) in the carriage.

A transverse-adjustment bushing can also be omitted if either the hole (7) in the foot (1a) or the hole (7b) in the carriage (4) has a collar, which projects into the other component, on the corresponding side, likewise producing horizontal fixing of the two components.

In the case of generator bearings, predominantly elastomers are employed. Elastomer bearings are adequately known per se. The described bearings according to the invention are also preferably elastomer bearings. The elastomers used for these generator bearings are known from the prior art and are adequately described in the relevant literature. Commercially available natural rubbers or plastics are preferably employed. Examples of suitable elastomers are: natural rubber, isoprene, butadiene, polynorbornene, chloroprene, styrene-butadiene, butyl, ethylene-propylene, nitrile, polyurethane, acrylate, ethylene-acrylate, silicone or fluorinated rubbers or plastics. The elastomer materials used for this invention preferably essentially consist of a natural rubber, a natural rubber derivative or a suitable elastic polymeric plastic or plastic mixture. In accordance with the invention, the elastomer layer can have different hardnesses ("Shore hardness") and different damping properties, corresponding to the desired requirements. Elastomers having a Shore hardness of 20 to 100, in particular 40 to 80, are preferably used. The preparation of elastomers of different hardness is adequately described in the prior art.

More Detailed Description of the Vertical Adjustment:

The height leveling of the generator must preferably be carried out under load, i.e. the entire generator weight must be adjusted. In the case where the generator first has to be lifted, adjustment is only possible with difficulty, since the elastic generator bearings move vertically again due to the generator weight, making readjustment necessary.

In the newly developed bearing, this is not the case. Vertical adjustment is carried out via a polygonal key (14), preferably by means of a hexagonal Allen key, which is inserted through the generator hole (7) into a hexagon (11) which is located in the adjustment bolt (12). The generator can be adjusted in the vertical direction with retention of its weight by turning this vertically adjustable adjustment bolt (12), which is preferably screwed in the supporting nut (13). The fixing bolts (9) are not screwed in during vertical adjustment, meaning that the corresponding space remains for the hexagonal socket for vertical adjustment (11).

More Detailed Description of the Horizontal Adjustment

The horizontal-adjustment carriage (4) necessary for horizontal adjustment is preferably fixed radially to the generator foot (1a) via a transverse-adjustment bushing (6). The hole (7) in the generator foot offers a diameter which is adequate for this bushing. The generator can thus be adjusted in the horizontal direction perpendicular to the generator axis via the screw-connection unit (19, 5, 10, 15, 17). The adjustment force flow here takes place via the horizontal spindle (5), which is screwed into the threaded supporting ring (10) to varying depths in accordance with the requirements and thus changes the separation between (10) and (4). The horizontal spindle (5) is supported on (4) via a double flange. The carriage (4) has for this purpose a slot having a width which is somewhat larger than the slim spindle diameter (15) between the two stop flanges of the horizontal spindle (5). During horizontal adjustment, the fixing bolts (9) may already be attached, but should not be firmly tightened, enabling easy adjustment of the carriage (4). In the case where the carriage is screwed to the bearing foot (3) via a part which is firmly connected thereto, the thinner part of the transverse adjustment bolt (5) in the adjustment carriage (4) must be passed through a corresponding slot (18) in order for vertical adjustment to be possible.

The vertical alignment and adjustment is preferably carried out first, followed by the horizontal alignment and adjustment.

After final alignment in the vertical and horizontal directions, the bolts (9) are tightened and the generator is thus fixed. The diameter in the generator foot (1a), which is now too large for the bolt, is preferably bridged using a washer (16).

The essential advantage of the bearing according to the invention is that the generator/machine can be adjusted easily in the horizontal and vertical directions under load by a mechanism which is attached directly to the generator/machine bearing. No additional aids other than standard tools are necessary to move the generator or machine into the precise position.

DESCRIPTION OF THE REFERENCE NUMERALS IN THE DRAWINGS, IN THE TEXT AND IN THE CLAIMS 1 generator
1a generator foot
2 generator elastomer bearing according to the invention with transverse and height adjustment
3 bearing foot
4 horizontal-adjustment carriage
5 transverse adjustment bolt (horizontal spindle)
6 transverse-adjustment bushing
7 hole in generator foot 1a
7a hole in bearing foot
7b hole in adjustment carriage (4)
8 attachment nut for fixing bolt (9)
9 fixing bolt (9)
10 supporting ring (part of the screw-connection unit (19))
11 polygonal opening in vertical-adjustment bolt (12)
12 vertical-adjustment bolt
13 supporting nut in hole (7a) in the bearing foot
14 polygonal (hexagonal) key for vertical adjustment
15, 17 parts of screw-connection unit (19)
16 washer for fixing bolt (9)
18 slot in carriage (4)
19 screw-connection unit (part of the carriage (4))
20 threaded part for fixing the adjustment carriage (4)
(a) maximum adjustment travel of the carriage (4)

The invention claimed is:

1. A machine or generator bearing for horizontal and vertical adjustment, the bearing comprising:
a bearing foot (3), to which a generator/machine block being connected by a fixing bolt (9) passing through a hole (7) in a foot (1a) of the gearbox/machine block (1) and being fixed and tightened by a thread (8) either in or on the bearing foot (3), so as to prevent lateral movement of a vertical axis that is defined by the fixing bolt and the thread either in or on the bearing foot;
the bearing foot (3) having an adjustment bolt (12), for vertical adjustment of the generator/machine block, which is screwed vertically together with a threaded part (13) which is connected to the bearing foot (3), the adjustment bolt (12) having either a centrally arranged square or a polygonal opening (11) having a diameter which is greater than a diameter of the fixing bolt (9) for accommodating a corresponding polygonal key (14), by which the vertical-adjustment bolt (12) being screwable from above in and out through the hole (7) in the foot (1a) of the gearbox/machine block (1) via the fixing bolt (9) and thereby causing one of a lowering and a raising of the generator/machine block under load along the vertical axis; and
the bearing foot (3) has a movable carriage (4), for horizontal adjustment of the generator/machine block, being provided with a hole (7b) and which is installed between the bearing foot (3) and the foot (1a) of the generator/machine block (1) and being adjustable horizontally perpendicular to the vertical axis, the carriage (4) and the gearbox/machine block (1) fixed thereto being movable horizontally, by a screw-connection device (19) mounted on the carriage, by screwing the screw-connection device (19) together with a threaded part (20), which is connected to the bearing foot (3) and holds and guides the carriage so that the carriage is horizontally movable to and fro with respect to the vertical axis; and
a transverse-adjustment bushing (6) is inserted into the hole (7b) in the carriage (4) with a close fit and projects beyond an upper carriage surface and fits exactly into the hole (7) in the foot (1a) of the generator/machine block (1) thereabove to fix the same.

2. The bearing according to claim 1, wherein the threaded part (13) is a supporting nut which is either attached to the bearing foot or in a centrally arranged hole (7a) in the bearing foot.

3. The bearing according to claim 1, wherein the threaded part (13) corresponds to a thread which is either cut into the bearing foot or in a centrally arranged hole (7a) in the bearing foot.

4. The bearing according to claim 1, wherein the thread (8) is an attachment nut which is either attached to the bearing foot or in a centrally arranged hole in the bearing foot, and the fixing bolt (9) is tightened by the attachment nut.

5. The bearing according to claim 1, wherein the bearing foot (3) has a central hole (7a).

6. The bearing according to claims 1, wherein the vertical-adjustment bolt (12) has a hexagonal opening which accommodates a corresponding polygonal key (14).

7. The bearing according to claim 1, wherein a diameter of the hole (7b) in the carriage (4) corresponds to a diameter of the hole (7) in the foot (1a) of the generator/machine block (1), and the generator/machine block is placed on the carriage (4) such that the hole (7b) in the carriage (4) and the hole (7) in the foot (1a) of the generator/machine block (1) are aligned one above the other.

8. The bearing according to claim 1, wherein a diameter of the hole (7) in the foot (1a) of the generator/machine block (1) is greater than a diameter of the fixing bolt (9), and a difference between the diameter of the hole (7) in the foot (1a) of the generator/machine block (1) and the diameter of the fixing bolt (9) represents a maximum horizontal-adjustment travel (a) by which the movable carriage (4), and thus the generator/machine block (1), is laterally adjustable in one direction.

9. The bearing according to claim 8, wherein the maximum adjustment travel (a) is between 10 and 20 mm.

10. A machine or generator bearing for horizontal and vertical adjustment, the bearing comprising:
a bearing foot (3), to which a generator/machine block being connected by a fixing bolt (9) passing through a hole (7) in a foot (1a) of the gearbox/machine block (1) and being fixed and tightened by a thread (8) either in or on the bearing foot (3), so as to prevent lateral movement of a vertical axis that is defined by the fixing bolt and the thread either in or on the bearing foot;
the bearing foot (3) having an adjustment bolt (12), for vertical adjustment of the generator/machine block, which is screwed vertically together with a threaded part (13) which is connected to the bearing foot (3), the adjustment bolt (12) having either a centrally arranged square or a polygonal opening (11) having a diameter which is greater than a diameter of the fixing bolt (9) for accommodating a corresponding polygonal key (14), by which the vertical-adjustment bolt (12) being screwable from above in and out through the hole (7) in the foot (1a) of the gearbox/machine block (1) via the fixing bolt (9) and thereby causing one of a lowering and a raising of the generator/machine block under load along the vertical axis; and
the bearing foot (3) has a movable carriage (4), for horizontal adjustment of the generator/machine block, being provided with a hole (7b) and which is installed between the bearing foot (3) and the foot (1a) of the generator/machine block (1) and being adjustable horizontally perpendicular to the vertical axis, the carriage (4) and the gearbox/machine block (1) fixed thereto being movable horizontally, by a screw-connection device (19) mounted on the carriage, by screwing the screw-connection device (19) together with a threaded part (20), which is connected to the bearing foot (3) and holds and guides the carriage so that the carriage is horizontally movable to and fro with respect to the vertical axis; and a transverse-adjustment bushing (6) is inserted into the hole (7) in the foot (1a) of the generator/machine block with a close fit and projects beyond a lower surface of the foot (1a) of the generator/machine block (1) and thus fits exactly into the hole (7b) of the carriage (4) therebelow and thus fixes the generator/machine block.

11. The bearing according to claim 1, wherein the screw-connection device (19) is a spindle bolt (5, 15) which terminates in a threaded supporting ring (10), which is screwed into and out of the threaded part (20) for horizontal adjustment.

12. The bearing according to claim 1, wherein the threaded part (20) is integrally connected to the bearing foot (3).

13. The bearing according to claim 1, wherein the threaded part (20) is a component which is separated from the bearing foot (3).

14. The bearing according to claim 13, wherein the threaded part (20) is connected to the vertical-adjustment bolt (12) and is adjusted vertically with the latter.

15. The bearing according to claim 1, wherein the bearing is an elastomer bearing.

16. A bearing for a generator of a wind turbines facilitating at least one of horizontal and vertical adjustment thereof, the bearing comprising:

a bearing foot (3) to which a generator/machine block being connected by a fixing bolt (9) passing through a hole (7) in a foot (1a) of the gearbox/machine block (1) and being fixed and tightened by a thread (8) one of in and on the bearing foot (3), so as to prevent lateral movement of a vertical axis that is defined by the fixing bolt and the thread either in or on the bearing foot;

the bearing foot (3) having an adjustment bolt (12), for vertical adjustment of the generator/machine block, being screwed vertically together with a threaded part (13) which is connected to the bearing foot (3), the adjustment bolt (12) having one of a centrally arranged square and polygonal opening (11) having a diameter which is greater than a diameter of the fixing bolt (9) for accommodating a corresponding polygonal key (14), by which the vertical-adjustment bolt (12) being screwable from above in and out through the hole (7) in the foot (1a) of the gearbox/machine block (1) via the fixing bolt (9), thereby so as to raise and lower the generator/machine block along the vertical axis; and the bearing foot (3) has a movable carriage (4), for horizontal adjustment of the generator/machine block, which is provided with a hole (7b) and which is installed between the bearing foot (3) and the foot (1a) of the generator/machine block (1) and being horizontally adjustable perpendicular to the vertical axis, the carriage (4) and the gearbox/machine block (1) fixed thereto being movable horizontally by a screw-connection device (19) mounted on the carriage by screwing the screw-connection device (19) together with a threaded part (20), which is connected to the bearing foot (3) and holds and guides the carriage so that the carriage is movable horizontally to and fro with respect to the vertical axis; and a transverse-adjustment bushing (6) is inserted into the hole (7b) in the carriage (4) with a close fit and projects beyond an upper carriage surface and fits exactly into the hole (7) in the foot (1a) of the generator/machine block (1) thereabove to fix the same.

17. The bearing according to claim 16, wherein a diameter of the hole (7) in the foot (1a) of the generator/machine block (1) is greater than a diameter of the fixing bolt (9), and a difference between the diameter of the hole (7) in the foot (1a) of the generator/machine block (1) and the diameter of the fixing bolt (9) represents a maximum horizontal-adjustment travel (a) by which the movable carriage (4), and the generator/machine block (1), are horizontally adjustable with respect to the vertical axis.

18. The bearing according to claim 17, wherein the maximum horizontal-adjustment travel (a) is between 10 and 20 mm.

* * * * *